United States Patent
Nicks et al.

(10) Patent No.: US 9,872,250 B2
(45) Date of Patent: Jan. 16, 2018

(54) DATA ACQUISITION NODE AND METHOD OF OPERATING SAME

(71) Applicant: The Boeing Company, Huntington Beach, CA (US)

(72) Inventors: Eric Lee Nicks, O'Fallon, MO (US); David Allan Followell, Wildwood, MO (US); Javier Cortez, Glen Carbon, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/477,370

(22) Filed: Sep. 4, 2014

(65) Prior Publication Data

US 2016/0073346 A1    Mar. 10, 2016

(51) Int. Cl.
*H04W 52/02* (2009.01)
*H04L 29/08* (2006.01)
*H04W 84/18* (2009.01)
*H04W 40/00* (2009.01)

(52) U.S. Cl.
CPC ......... *H04W 52/0229* (2013.01); *H04L 67/12* (2013.01); *H04W 40/00* (2013.01); *H04W 84/18* (2013.01); *Y02B 60/50* (2013.01)

(58) Field of Classification Search
None
See application file for complete search history.

(56) References Cited

U.S. PATENT DOCUMENTS

| 6,104,914 | A | 8/2000 | Wright et al. |
| 6,799,094 | B1 | 9/2004 | Vaida et al. |
| 7,506,517 | B2 | 3/2009 | Uluyol et al. |
| 2006/0082455 | A1* | 4/2006 | Andres et al. ............. 340/539.1 |
| 2008/0236275 | A1* | 10/2008 | Breed et al. ................ 73/290 V |
| 2009/0240604 | A1* | 9/2009 | Thurston ............ G06Q 10/0875 705/29 |
| 2011/0202229 | A1* | 8/2011 | Owens ................ B60C 23/0401 701/31.4 |
| 2011/0309956 | A1* | 12/2011 | Westhues et al. .............. 341/22 |
| 2012/0207040 | A1* | 8/2012 | Comsa .............. H04W 72/1215 370/252 |
| 2014/0372498 | A1* | 12/2014 | Mian et al. ................... 709/201 |

* cited by examiner

*Primary Examiner* — Mohammad Anwar
*Assistant Examiner* — Angel Brockman
(74) *Attorney, Agent, or Firm* — Armstrong Teasdale LLP (57) ABSTRACT

A data acquisition node for coupling to a system of a vehicle includes a processor coupled to a communication interface. The processor is configured to transition from a sleep mode to a start-up detect mode after an imminent-event message is received at the communication interface. The communication interface is substantially deactivated while in the start-up detect mode. The processor also is configured to monitor sensor data from at least one sensor while in the start-up detect mode. The at least one sensor is operable to generate a signal that is representative of a physical characteristic of the system.

21 Claims, 4 Drawing Sheets

DATA ACQUISITION NODE AND METHOD OF OPERATING SAME

BACKGROUND

The field of the disclosure relates generally to wireless data acquisition nodes, and, more particularly, to systems and methods for operating wireless data acquisition nodes with reduced power consumption.

At least some known systems, including vehicles such as aircraft, include data acquisition nodes that monitor certain parameters associated with the system. At least some such known data acquisition nodes are remotely located, such that no connections to system power or data busses are available. Such "disconnected" nodes may be used, to cite just a few examples, to monitor pressure at a location in a vehicle environmental control system, to monitor electrical current to a fan of a vehicle environmental control system, to monitor strain in aircraft landing gear components, and/or to monitor any number of parameters associated with any of a wide variety of systems.

Such disconnected data acquisition nodes must use a self-contained power source, such as a small battery, to support data acquisition, potentially at thousands of samples per second, and to support wireless transmission of the acquired data for use or storage by a system server. However, data acquisition and wireless transmission are relatively power-intensive operations. Consequently, at least some known "disconnected" data acquisition nodes have a limited battery life. Moreover, battery replacement on a multitude of disconnected nodes distributed throughout a system, such as in various hard-to-access locations on an aircraft, is a labor- and time-intensive process.

BRIEF DESCRIPTION

In one aspect, a data acquisition node for coupling to a system of a vehicle is provided. The data acquisition node includes a processor coupled to a communication interface. The processor is configured to transition from a sleep mode to a start-up detect mode after an imminent-event message is received at the communication interface. The communication interface is substantially deactivated while in the start-up detect mode. The processor also is configured to monitor sensor data from at least one sensor while in the start-up detect mode. The at least one sensor is operable to generate a signal that is representative of a physical characteristic of the system.

In another aspect, a method of operating a data acquisition node is provided. The data acquisition node is coupled to a system of a vehicle. The method includes transitioning from a sleep mode to a start-up detect mode after an imminent-event message is received at a communication interface of the data acquisition node. The communication interface is substantially deactivated while in the start-up detect mode. The method also includes monitoring sensor data from at least one sensor while in the start-up detect mode. The at least one sensor is operable to generate a signal that is representative of a physical characteristic of the system.

In another aspect, a non-transitory computer-readable medium having computer-executable instructions embodied thereon is provided. When executed by a data acquisition node that includes a communication interface, the computer-executable instructions cause the data acquisition node to transition from a sleep mode to a start-up detect mode after an imminent-event message is received. The communication interface is substantially deactivated while in the start-up detect mode. The computer-executable instructions also cause the data acquisition node to monitor sensor data from at least one sensor while in the start-up detect mode. The at least one sensor is operable to generate a signal that is representative of a physical characteristic of a system of a vehicle.

The features, functions, and advantages that have been discussed can be achieved independently in various embodiments or may be combined in yet other embodiments further details of which can be seen with reference to the following description and drawings.

DETAILED DESCRIPTION

Embodiments of the data acquisition node and method described herein provide for operation in each of an extremely low-power sleep mode, a reduced-power start-up detect mode, and a relatively higher power normal mode. The embodiments provide that a transmitter/receiver of the node requires power only intermittently, and for only a relatively short activation period, during sleep mode, and requires substantially no power during start-up detect node. The embodiments further provide for a transmission of sensor data of interest for real-time or near-real-time use at a server during normal mode, while preserving the operational lifetime of a power source of the node, such as a battery.

In one embodiment, technical effects of the methods, systems, and computer-readable media described herein include at least one of: (a) activating a communication interface of the data acquisition node intermittently while in the sleep mode to check for an imminent-event message, (b) transitioning to the start-up detect mode after the imminent-event message is received, wherein the communication interface is substantially deactivated while in the start-up detect mode, (c) monitoring sensor data from at least one sensor while in the start-up detect mode, wherein the at least one sensor is operable to generate a signal that is representative of a physical characteristic of the system, and (d) transitioning to the normal mode after the monitored sensor data satisfies a trigger profile, wherein the communication interface is activated in the normal mode.

Figure 1:
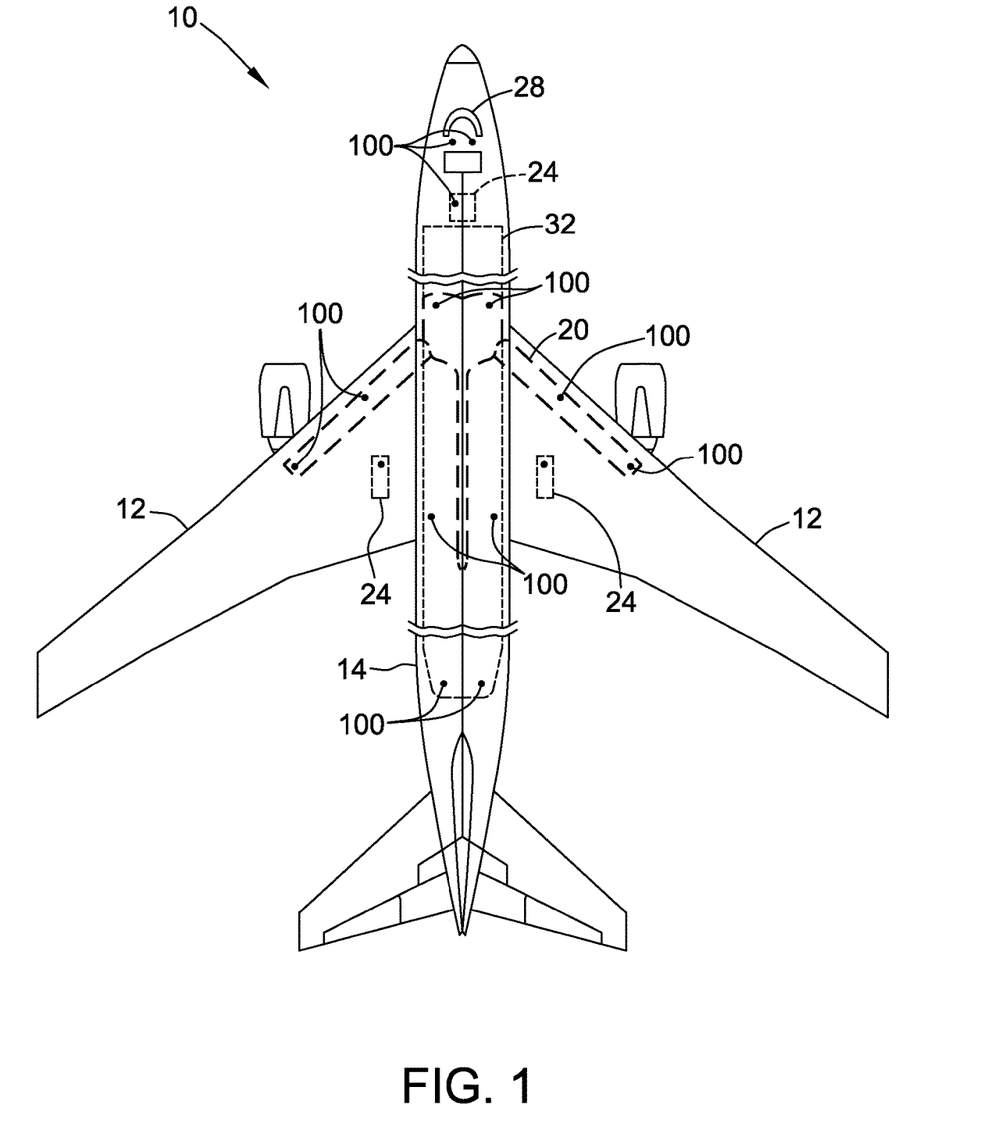
FIG. 1 is a schematic diagram of an exemplary aircraft that includes at least one exemplary data acquisition node.

Referring more particularly to the drawings, implementations of the disclosure may be described in the context of an aircraft 10 shown schematically in FIG. 1. Aircraft 10 includes at least one wing 12 that extends from a fuselage 14. A plurality of systems are represented schematically on aircraft 10, including an environmental control system 20 and a plurality of landing gear systems 24. In addition, a cockpit 28 and a cabin 32 of aircraft 10 each include a plurality of switches and other controls (not shown). The plurality of systems shown on aircraft 10 is for illustrative purposes only, and it should be understood that aircraft 10 additionally includes a large number of other systems. Moreover, it should be understood that, although an aerospace example is shown, the principles of the disclosure may be applied to other systems, such as an automotive system.

Aircraft 10 includes at least one data acquisition node 100. Each data acquisition node 100 is coupled to a corresponding system of aircraft 10 for acquisition of data associated with the corresponding system. For example, for each data acquisition node 100, the corresponding system may be, but is not limited to, environmental control system 20, one of landing gear systems 24, or at least one control located in one of cockpit 28 and cabin 32. In certain embodiments, data acquisition nodes 100 are not connected to either of an internal power system (not shown) and an internal data bus system (not shown) of aircraft 10. For example, an expense and/or complexity of installing a wired connection between each data acquisition node 100 and the internal power system and internal data bus system is undesirably large. As a result, data acquisition nodes 100 may be referred to as "disconnected" nodes in such embodiments. In alternative embodiments, at least one data acquisition node 100 is connected to at least one of the internal power system and the internal data bus system of aircraft 10.

Figure 2:
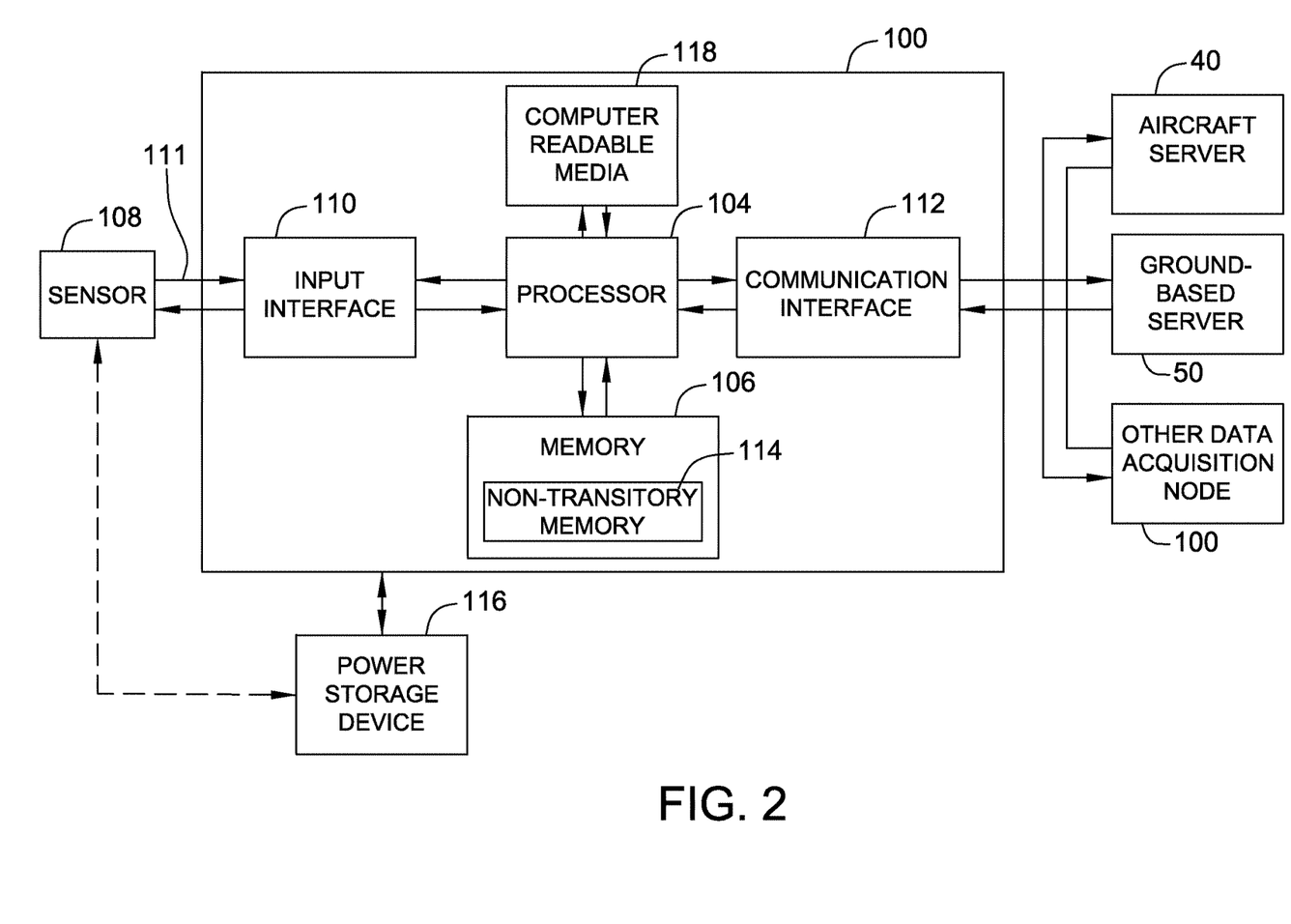
FIG. 2 is a schematic block diagram of an exemplary data acquisition node that may be used with the aircraft shown in FIG. 1.

FIG. 2 is a schematic block diagram of an exemplary data acquisition node 100 that may be used with a system such as aircraft 10. In the illustrated embodiment, data acquisition node 100 includes a memory 106 and a processor 104 that is coupled to memory 106 for executing programmed instructions. Processor 104 may include one or more processing units (e.g., in a multi-core configuration). Data acquisition node 100 is programmable to perform one or more operations described herein by programming memory 106 and/or processor 104. For example, processor 104 may be programmed by encoding an operation as one or more executable instructions and providing the executable instructions in memory device 106.

Processor 104 may include, but is not limited to, a general purpose central processing unit (CPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. The computer-readable medium may be non-transitory. Such instructions, when executed by processor 104, cause data acquisition node 100 to perform at least a portion of the methods described herein. The above examples are exemplary only, and thus are not intended to limit in any way the definition and/or meaning of the term processor.

Memory device 106, as described herein, is one or more devices that enable information such as executable instructions and/or other data to be stored and retrieved. Memory device 106 may include one or more computer-readable media, such as, without limitation, dynamic random access memory (DRAM), static random access memory (SRAM), a solid state disk, and/or a hard disk. Memory device 106 may be configured to store, without limitation, maintenance event log, diagnostic entries, fault messages, and/or any other type of data suitable for use with the methods and systems described herein.

In the illustrated embodiment, data acquisition node 100 includes an input interface 110 that is operable to receive input from at least one sensor 108. The at least one sensor 108 is operable to generate a signal 111 that is representative of a physical characteristic of the corresponding system of aircraft 10, as detected by sensor 108. In certain embodiments, sensor 108 is operable to generate signal 111 representative of at least one of a pressure, a temperature, a force, an acceleration, a noise level, a strain, a displacement, a switch state, and a control state of the corresponding system. Signal 111 is at least one of an analog and a digital signal.

Processor 104 is programmed to selectively activate and deactivate input interface 110. When activated, input interface 110 is operable to receive signal 111 and convert it into a form that is usable by processor 104. For example, processor 104 is programmed to perform certain operations using sensor data obtained from signal 111 received through input interface 110, in accordance with the methods described herein. When deactivated, input interface 110 is substantially inoperable to receive signal 111, and input interface 110 consumes relatively little or no power as compared to when input interface 110 is activated.

In the exemplary implementation, data acquisition node 100 includes a communication interface 112 coupled to at least one of memory device 106 and processor 104. Communication interface 112 is operable to communicate with at least one remote device, such as an aircraft server system 40, a ground-based server system 50, another data acquisition node 100, or any other suitable system that enables data acquisition node 100 to function as described herein. In certain embodiments, for example where data acquisition node 100 is a disconnected node, communication interface 112 is a wireless communications interface. For example, communication interface 112 is at least one of a wireless network adapter and a mobile telecommunications adapter. In an embodiment, communication interface 112 is a radio frequency ("RF") transmitter/receiver that uses a standard transmission protocol such as ZIGBEE®, BLUETOOTH® or active radio frequency identification ("RFID"). In another embodiment, communication interface 112 includes a non-RF wireless transmitter/receiver, such as without limitation an optical transmitter/receiver that utilizes infrared and/or visible wavelengths. It should be understood that the particular system used for wireless communication is not intended to limit the disclosure. In alternative embodiments, communication interface 112 includes a wired communication interface, such as a wired network adapter.

Processor 104 is programmed to selectively activate and deactivate communication interface 112. When activated, communication interface 112 is operable to transmit signals to, and receive signals from, at least one of aircraft server system 40, ground-based server system 50, other data acquisition node 100, and another suitable system, and to convert such signals to and from a form that is usable by processor 104. For example, processor 104 is programmed to perform certain operations based on signals received through communication interface 112 and to cause certain signals to be transmitted through communication interface 112, in accordance with the methods described herein. When deactivated, communication interface 112 is substantially inoperable to transmit and receive signals, and communication interface 112 consumes relatively little or no power as compared to when communication interface 112 is activated.

In the illustrated embodiment, instructions for operating systems and applications are located in a functional form on a non-transitory portion 114 of memory device 106 for execution by processor 104 to perform one or more of the processes described herein. Additionally or alternatively, these instructions may be embodied on different physical or tangible computer-readable media, such as at least one of another memory device (not shown) and a computer-readable media 118, which may include, without limitation, a flash drive, CD-ROM, thumb drive, floppy disk, etc. Computer-readable media 118 is selectively coupleable to data acquisition node 100 to permit access and/or execution by processor 104. In one example, computer-readable media 118 includes an optical or magnetic disc that is inserted or placed into a CD/DVD drive or other device coupleable to memory device 106 and/or processor 104. In some embodiments, computer-readable media 118 is not removable.

In the illustrated embodiment, data acquisition node 100 also includes at least one power storage device 116. Power storage device 116 provides power for operation of data acquisition node 100. Additionally or alternatively, data acquisition node 100 is connected to an internal power system (not shown) of aircraft 10, and the internal power system provides at least a portion of the power for operation of data acquisition node 100.

In a particular embodiment, power storage device 116 includes a battery. Additionally or alternatively, power storage device 116 includes an ultra-capacitor. Additionally or alternatively, power storage device 116 includes a fuel cell. Additionally or alternatively, power storage device 116 includes any suitable power storage system that enables data acquisition node 100 to function as described herein.

In certain embodiments, power storage device 116 provides power for operation of sensor 108. In some such embodiments, power for operation of sensor 108 is routed from power storage device 116 through input interface 110. Additionally or alternatively, sensor 108 includes a separate battery to provide power for sensor 108. Additionally or alternatively, sensor 108 is connected to an internal power system (not shown) of aircraft 10, and the internal power system provides at least a portion of the power for operation of sensor 108.

Figure 3:
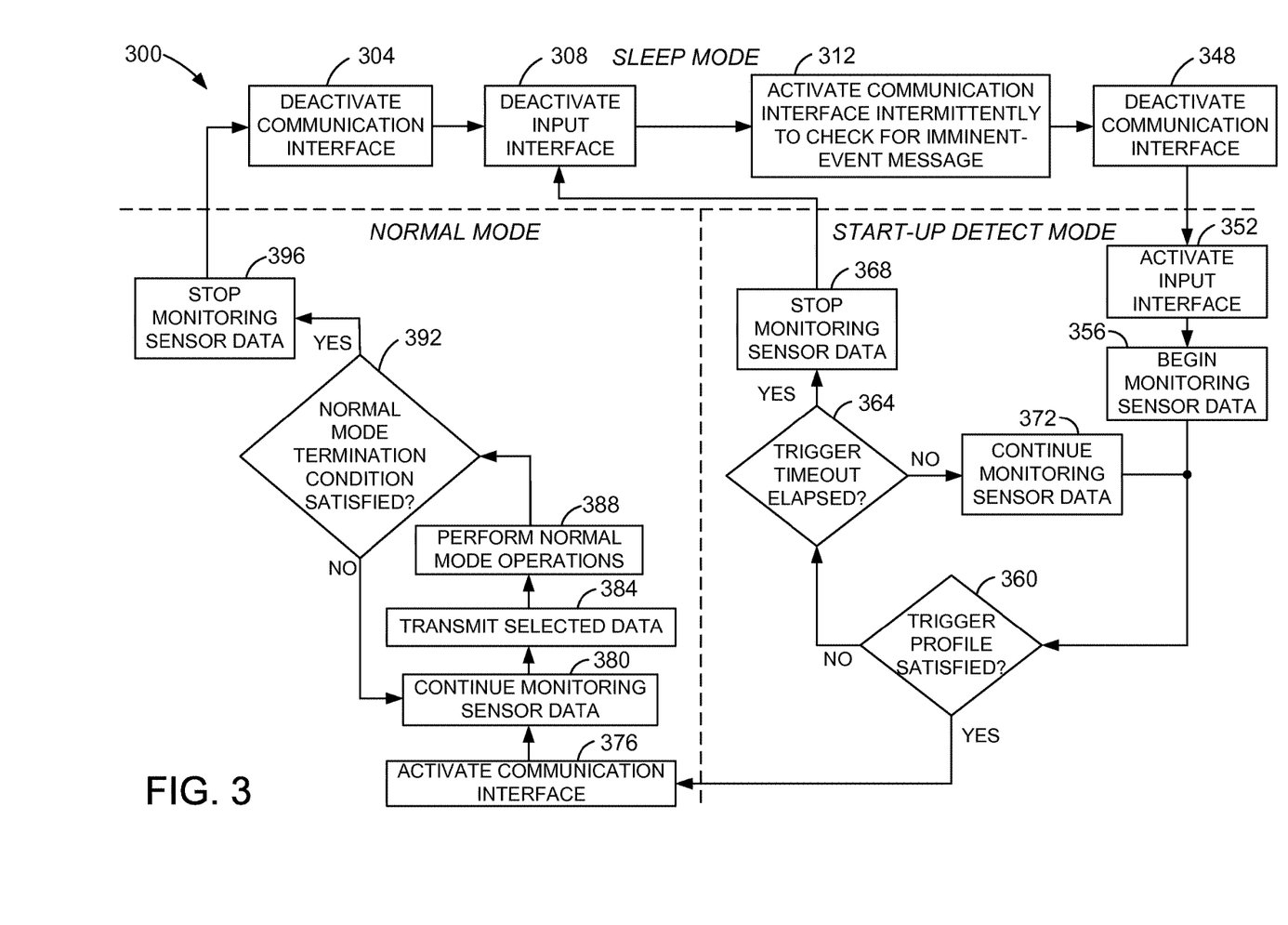
FIG. 3 is a flow diagram of an exemplary method of operating a data acquisition node, such as the data acquisition node shown in FIG. 2, coupled to a system of a vehicle, such as the aircraft shown in FIG. 1.
Figure 4:
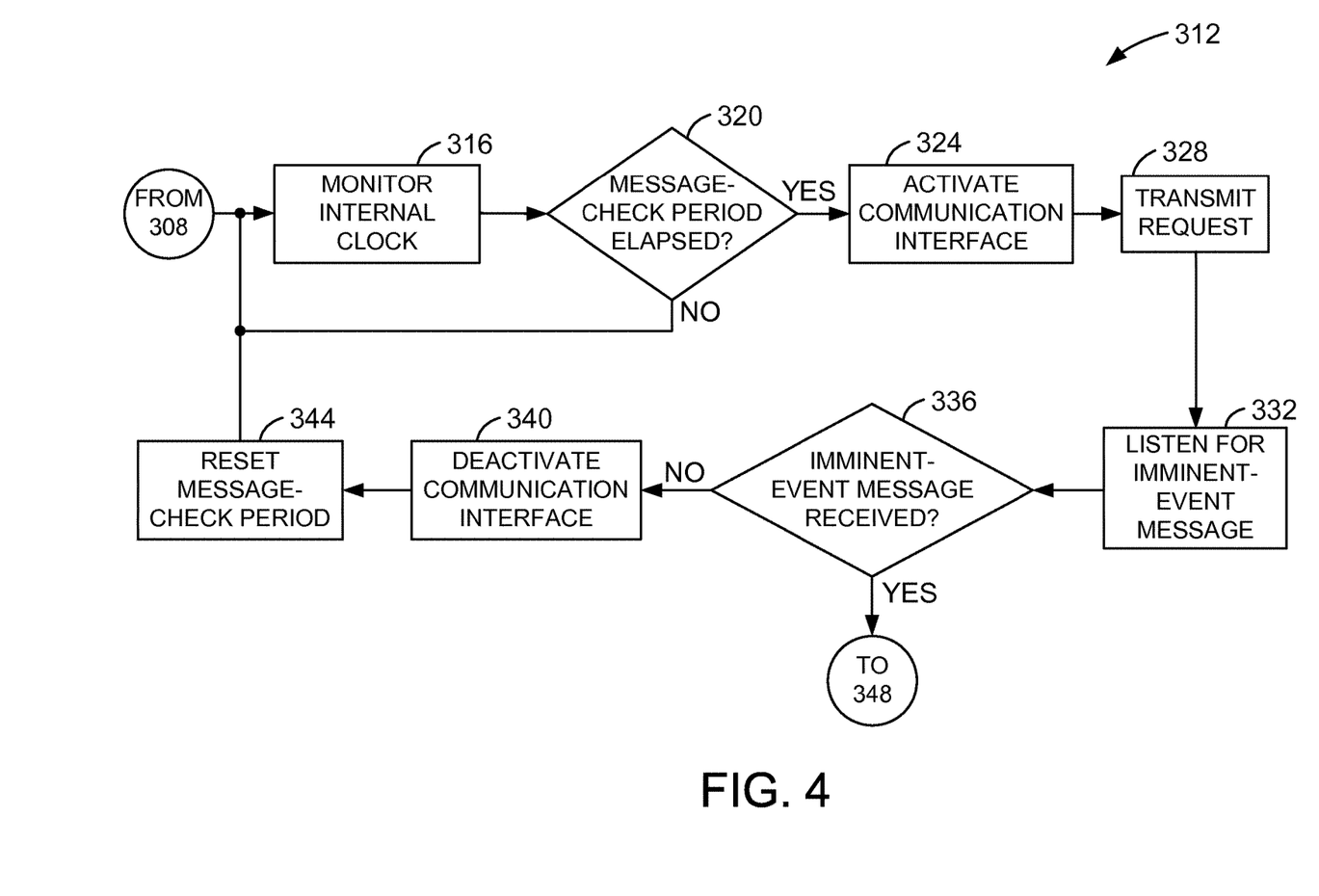
FIG. 4 is a flow diagram of an exemplary implementation of one of the steps of the method shown in FIG. 3.

FIG. 3 is a flow diagram of a method 300 of operating data acquisition node 100 coupled to a system of a vehicle, such as but not limited to environmental control system 20, one of landing gear systems 24, or at least one control located in one of cockpit 28 and cabin 32 of aircraft 10. FIG. 4 is a flow diagram of an example implementation of step 312 of method 300. With reference to FIGS. 1-4, in the illustrated embodiment, data acquisition node 100 is selectively operable in each of a sleep mode, a start-up detect mode, and a normal mode.

For purposes of illustration, method 300 starts with data acquisition node 100 in sleep mode. In sleep mode, processor 104 is programmed to initially deactivate 304 communication interface 112 and to deactivate 308 input interface 110. Processor 104 is further programmed to activate 312 communication interface 112 intermittently to check for a message that an event associated with the corresponding system, such as start-up, is imminent. In an embodiment, the step of activating 312 communication interface 112 occurs periodically, and the period between checking for the imminent-event message ("message-check period") is between about 1 minute and about 120 minutes. In another embodiment, the message-check period is between about 5 minutes and about 60 minutes. In another embodiment, the message-check period is about 5 minutes. In another embodiment, the message-check period is about 10 minutes. In another embodiment, the message-check period is about 30 minutes. In another embodiment, the intermittent checking is not strictly periodic, for example, the message-check period is variable. In alternative embodiments, the listening takes place in any suitable intermittent fashion that enables data acquisition node 100 to function as described herein.

In certain embodiments, an activation period during which communication interface 112 is activated at the end of each message-check period is relatively short. In an embodiment, the activation period is less than about 1 minute. In another embodiment, the activation period is less than about 30 seconds. In another embodiment, the activation period is less than about 10 seconds. Apart from such short periods of activation, communication interface 112 is deactivated during sleep mode. Thus, intermittent activation of communication interface 112 during sleep mode requires a relatively low level of power from power storage device 116. Moreover, in certain embodiments, certain other components of data acquisition node 100, such as input interface 110, are deactivated while in sleep mode, such that they require substantially zero power during sleep mode. Thus, in some embodiments, an overall requirement for power from power storage device 116 is relatively extremely low during sleep mode.

With continuing reference to FIGS. 1-4 and particular reference to FIG. 4, an illustrative embodiment of a non-limiting implementation for step 312 is shown. In the illustrated embodiment, step 312 includes monitoring 316 an internal clock, for example but not limited to a clock associated with processor 104, and determining 320 whether the message-check period has elapsed. The step of monitoring 316 requires a relatively extremely low level of power from power storage device 116. If the message-check period has not elapsed, the monitoring 316 continues.

After the message-check period has elapsed, processor 104 is programmed to activate 324 communication interface 112 and transmit 328 from communication interface 112 a request, for example to at least one of aircraft server system 40, ground-based server system 50, and another data acquisition node 100, for the imminent-event message. Processor 104 is further programmed to listen 332 for the imminent-event message in response and determine 336 whether the imminent-event message is received by communication interface 112. In the case that the imminent-event message is not received by communication interface 112 during the activation period, processor 104 is programmed to deactivate 340 communication interface 112, reset 344 the message-check period, and return to the step of monitoring 316 the internal clock until the next message-check period elapses.

After the imminent event message is received in step 312, for example as determined in step 336, processor 104 is programmed to deactivate 348 communication interface 112 and to transition to start-up detect mode. In certain embodiments, communication interface 112 remains substantially deactivated while in the start-up detect mode, such that it requires little or no power from power storage device 116.

With continuing reference to FIGS. 1-4 and particular reference to FIG. 3, in start-up detect mode, processor 104 is programmed to activate 352 input interface 110 and to begin 356 monitoring sensor data received from the at least one sensor 108 via input interface 110. Processor 104 further is programmed to determine 360 whether the sensor data satisfies a trigger profile. The trigger profile is at least one value, such as a threshold sensor data level or a series of expected sensor data values, associated with the at least one sensor 108. For example, the trigger profile is satisfied when the sensor data exceeds the threshold level or matches the series of expected values within a pre-selected tolerance. The trigger profile is pre-selected to indicate that the corresponding system of aircraft 10 has entered an operational phase for which sensor data should be transmitted by data acquisition node 100. In the illustrated embodiment, the trigger profile is stored in a memory device coupled to processor 104, such as one of memory device 106, which may include non-transitory portion 114 of memory device 106, another memory device (not shown) coupled to processor 104, and computer-readable media 118.

As one non-limiting example, if it is desired to transmit sensor data acquired for a five-second time period during start-up of the system corresponding to data acquisition node 100, the trigger profile is selected to be a threshold sensor data level or a series of expected sensor data values corresponding to system start-up. More specifically, in an embodiment, the at least one sensor 108 is operable to measure a differential pressure associated with environmental control system 20 of aircraft 10, and the trigger profile is a threshold differential pressure which, when detected, indicates that environmental control system 20 is starting operations. In another embodiment, the at least one sensor 108 is operable to measure a state of each of a plurality of switches associated with cockpit 28 of aircraft 10, and the trigger profile is a set of switch state values for the plurality of switches which, when detected, indicates that cockpit 28 is starting operations. In still another embodiment, the at least one sensor 108 is operable to measure a strain associated with one of landing gear systems 24 of aircraft 10, and the trigger profile is a threshold strain level which, when detected, indicates that the one of landing gear systems 24 is starting operations. It should be understood that the embodiments listed above are illustrative only, and not intended to be limiting.

In certain embodiments, the trigger profile is created from at least one of operational data acquired from a previous start-up of the corresponding system and/or an analogous system, bench-test data acquired from a previous start-up of the corresponding system and/or an analogous system, and theoretical or model predictions of the start-up behavior of the corresponding system and/or an analogous system. In alternative embodiments, the trigger profile is created from any other suitable source of data that enables data acquisition node 100 to function as described herein.

In the case that processor 104 determines in step 360 that the sensor data does not satisfy the trigger profile, processor 104 is programmed to determine 364 whether a trigger timeout has elapsed. The trigger timeout is a preselected maximum time period for which data acquisition node 100 is permitted to remain in start-up detect mode. In the case that processor 104 determines in step 364 that the trigger timeout has elapsed, processor 104 is programmed to stop 368 monitoring sensor data and transition back to sleep mode, for example by returning to the step of deactivating 308 input interface 110. (It should be understood that communication interface 112 already was deactivated while in start-up detect mode.) The trigger timeout ensures that data acquisition node 100 does not remain indeterminately in start-up detect mode if, for example, an unforeseen circumstance delays or postpones the imminent event after the imminent-event message is received.

In the case that processor 104 determines in step 364 that the trigger timeout has not elapsed, processor 104 is programmed to continue 372 monitoring sensor data received from the at least one sensor 108 via input interface 110 and determining 360 whether the sensor data satisfies the trigger profile. In certain embodiments, communication interface 112 remains substantially deactivated while in start-up detect mode, such that it requires little or no power from power storage device 116. Because input interface 110 remains activated and processor 104 continues to monitor sensor data and compare the monitored sensor data to the trigger profile, a relatively increased level of power is required from power storage device 116 during start-up detect mode as compared to sleep mode. Because no power is required for transmitting and receiving signals via communication interface 112, however, a relatively reduced level of power is required from power storage device 116 during start-up detect mode as compared to normal mode.

After processor 104 determines in step 360 that the monitored sensor data satisfies the trigger profile, processor 104 is programmed to transition to normal mode. In normal mode, processor 104 is programmed to activate 376 communication interface 112 and to continue 380 monitoring sensor data received from the at least one sensor 108 via input interface 110. Processor 104 is further programmed to transmit 384 selected sensor data received from the at least one sensor 108, for example to at least one of aircraft server system 40, ground-based server system 50, and another data acquisition node 100. In an embodiment, the selected data is obtained from the at least one sensor 108 directly via input interface 110, and thus constitutes real-time data. In another embodiment, at least a portion of the selected data from the at least one sensor 108 is obtained from input interface 110 during start-up mode and buffered for a short time in memory device 106, such as but not limited to for less than about five seconds or less than about ten seconds, and thus constitutes near-real-time data. Thus, the at least one of aircraft server system 40, ground-based server system 50, and another data acquisition node 100 that receives the transmitted data can make decisions in real time or near-real time based on the data from the at least sensor 108.

In certain embodiments, processor 104 also is programmed to perform 388 additional normal mode operations. The additional normal mode operations in step 388 include any function or algorithm desired to be performed by data acquisition node 100 and suitable for execution by processor 104.

Processor 104 further is programmed to determine 392 whether a normal mode termination condition is satisfied. In an embodiment, the normal mode termination condition is a termination message received from one of aircraft server system 40, ground-based server system 50, and another data acquisition node 100. In another embodiment, the normal mode termination condition is the expiration of a predetermined data acquisition period. In another embodiment, the normal mode termination condition is a termination profile. The termination profile is at least one value, such as a threshold sensor data level or a series of expected sensor data values, associated with the at least one sensor 108. The termination profile is pre-selected to indicate that the corresponding system of aircraft 10 has entered an operational phase for which sensor data is not desired to be transmitted by data acquisition node 100. In the case that processor 104 determines that the normal mode termination condition is not satisfied, processor 104 is programmed to return to the step of continuing 380 to monitor sensor data received from the at least one sensor 108 via input interface 110, and transmitting 384 selected data received from the at least one sensor 108.

After processor 104 determines in step 392 that the normal mode termination condition is satisfied, processor 104 is programmed to return to sleep mode. More specifically, processor 104 is programmed to stop 396 monitoring sensor data and to return to the step of deactivating 304 communication interface 112 and deactivating 308 input interface 110. Method 300 then returns to the step of activating 312 communication interface 112 intermittently to check for the imminent-event message.

Data acquisition node 100 programmed to operate in each of sleep mode, start-up mode, and normal mode facilitates prolonging an operational lifetime of power storage device 116. For example, in certain embodiments, data acquisition node 100 is associated with a corresponding system of aircraft 10, the trigger profile is selected to indicate a start-up of the corresponding system, and processor 104 is programmed to remain in normal mode for a five-second data acquisition period after the trigger profile is satisfied. In one such embodiment, power storage device 116 has an operational lifetime of at least 10 years. In another such embodiment, power storage device 116 has an operational lifetime of at least 20 years. In another such embodiment, power storage device 116 has an operational lifetime of at least 30 years.

The embodiments described herein provide a data acquisition node programmed to operate in each of a sleep mode, a start-up detect mode, and a normal mode. The embodiments provide that a communications interface of the node requires power only intermittently, and for only a relatively short activation period each time, during sleep mode. The embodiments also provide that a communications interface of the node requires substantially no power during start-up detect mode. The embodiments further provide for a transmission of real-time or near-real-time sensor data during normal mode.

The embodiments described herein provide improvements over at least some known data acquisition nodes. As compared to known data acquisition nodes that transmit continuously, the embodiments described herein enable a data acquisition node to remain in an extremely low power sleep mode until a system event is imminent, and further enable the data acquisition node to remain in a relatively reduced power start-up detect mode until the node independently determines that a trigger profile is satisfied. As compared to known data acquisition nodes that store all data locally for post-operational download, the embodiments described herein enable the data acquisition node to transmit sensor data of interest for use in real time or near-real time during a normal operational mode. Thus, the embodiments described herein provide the benefits of real-time and/or near-real-time data acquisition while prolonging an operational lifetime of a power storage device.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A data acquisition node for coupling to a system of a vehicle, said data acquisition node operable in each of a sleep mode wherein sensor data is not monitored, a start-up detect mode wherein sensor data is monitored, and a normal mode wherein sensor data is transmitted, wherein said data acquisition node comprises:
   a communication interface operable to communicate with at least one remote device;
   a memory device capable of storing a trigger profile associated with a physical characteristic of the vehicle; and
   a processor coupled to said communication interface and said memory device, said processor configured to:
      activate said communication interface intermittently while in the sleep mode to check for an imminent-event message from the at least one remote device;
      transition from the sleep mode to the start-up detect mode after the imminent-event message is received by said communication interface, wherein said communication interface is substantially deactivated while in the start-up detect mode such that said communication interface is not operable to communicate with the remote device;
      monitor sensor data from at least one sensor while in the start-up detect mode, wherein the monitored sensor data is representative of the physical characteristic of the vehicle;
      determine whether the monitored sensor data satisfies the trigger profile;
      transition to the normal mode after determining that the monitored sensor data satisfies the trigger profile, wherein monitoring of sensor data continues in the normal mode, and wherein said communication interface is activated in the normal mode and transmits the monitored sensor data; and
      transition to the sleep mode after determining that the monitored sensor data does not satisfy the trigger profile after a trigger timeout period of time.

2. The data acquisition node according to claim 1, further comprising an input interface operable to receive input from the at least one sensor, wherein said processor is further configured to deactivate said input interface while in the sleep mode and to activate said input interface after the imminent-event message is received.

3. The data acquisition node according to claim 1, wherein said processor is further configured to:
   determine whether a normal mode termination condition is satisfied; and
   return to the sleep mode after the normal mode termination condition is satisfied.

4. The data acquisition node according to claim 1, wherein said communication interface is a wireless communication interface.

5. The data acquisition node according to claim 1, wherein the imminent event message indicates that a system event is imminent, and said processor is further configured to monitor sensor data associated with the system event while in the startup detect mode.

6. The data acquisition node according to claim 1, wherein the imminent event message indicates that a system event is imminent, and said processor is further configured to:
   monitor the sensor data while in the startup detect mode for a predetermined quantity of time; and
   transition from the startup detect mode to the sleep mode after the monitored sensor data fails to satisfy the trigger profile and the predetermined quantity of time has elapsed.

7. The data acquisition node according to claim 1, wherein the imminent event message indicates that a system event is imminent, and said processor is further configured to:
   buffer sensor data acquired during the system event while in the startup detect mode; and
   transmit the buffered sensor data via said communication interface while in the normal mode.

8. The data acquisition node according to claim 1, wherein said processor is powered solely from a power source installed within said data acquisition node.

9. The data acquisition node according to claim 1, wherein the trigger profile is associated with at least one of a pressure, a temperature, a force, an acceleration, a noise level, a strain, a displacement, a switch state, and a control state of the vehicle, and the monitored sensor data is representative of the at least one of the pressure, the temperature, the force, the acceleration, the noise level, the strain, the displacement, the switch state, and the control state of the vehicle.

10. The data acquisition node according to claim 1, wherein the trigger profile is associated with at least one of an environmental control system, a landing gear system, and a control located in one of a cockpit and a cabin of the vehicle, and the monitored sensor data is representative of the at least one of the environmental control system, the landing gear system, and the control.

11. A method of operating a data acquisition node coupled to a system of a vehicle, said method comprising:
operating the data acquisition node in a sleep mode, wherein a sensor input interface of the data acquisition node is deactivated such that the sensor input interface is inoperable to acquire data, and wherein a communication interface of the data acquisition node is activated from a low power mode only intermittently to enable communication with a remote device;
transitioning the data acquisition node from the sleep mode to a start-up detect mode, wherein the communication interface is in the low power mode such that the communication interface is not operable to communicate with the remote device, and wherein the sensor input interface is operable to acquire data representative of a physical characteristic of the vehicle;
transitioning the data acquisition node from the start-up detect mode to a normal mode in response to the data acquired by the sensor input interface in the start-up detect mode satisfying a trigger profile associated with the physical characteristic of the vehicle, wherein the communication interface in the normal mode is operable to transmit sensor data from at least one sensor and the sensor input interface is operable to acquire data; and
transitioning the data acquisition node from the start-up detect mode to the sleep mode in response to the data acquired by the sensor input interface in the start-up detect mode not satisfying the trigger profile associated with the physical characteristic of the vehicle after a trigger timeout period of time.

12. The method according to claim 11, wherein activating the communication interface intermittently while in the sleep mode comprises activating the communication interface from the low power mode intermittently to check for an imminent-event message.

13. The method according to claim 12, wherein transitioning to the start-up mode comprises activating the input interface after the imminent-event message is received, such that the input interface is operable to receive input from at least one sensor, wherein the at least one sensor is operable to generate a signal that is representative of the physical characteristic of the system.

14. The method according to claim 11, further comprising: determining whether a normal mode termination condition is satisfied; and returning to the sleep mode after the normal mode termination condition is satisfied.

15. The method according to claim 11, further comprising wirelessly transmitting selected sensor data representative of the physical characteristic of the vehicle from the communication interface while in the normal mode.

16. A non-transitory computer-readable medium having computer-executable instructions embodied thereon, wherein when executed by a data acquisition node comprising a communication interface, the computer-executable instructions cause the data acquisition node to:
operate in a sleep mode, wherein a sensor input interface of the data acquisition node is deactivated such that the sensor input interface is inoperable to acquire data, and wherein a communication interface of the data acquisition node is activated from a low power mode only intermittently to enable communication with a remote device;
transition from the sleep mode to a start-up detect mode, wherein the communication interface is in the low power mode such that the communication interface is not operable to communicate with the remote device, and wherein the sensor input interface is operable to acquire data representative of a physical characteristic of a vehicle;
transition from the start-up detect mode to a normal mode in response to the data acquired by the sensor input interface in the start-up detect mode satisfying a trigger profile associated with the physical characteristic of the vehicle, wherein the communication interface in the normal mode is operable to transmit sensor data from at least one sensor and the sensor input interface is operable to acquire data; and
transition from the start-up detect mode to the sleep mode in response to the data acquired by the sensor input interface in the start-up detect mode not satisfying the trigger profile associated with the physical characteristic of the vehicle after a trigger timeout period of time.

17. The non-transitory computer-readable medium according to claim 16, wherein the computer-executable instructions cause the data acquisition node to activate the communication interface from the low power mode intermittently while in the sleep mode to check for an imminent-event message.

18. The non-transitory computer-readable medium according to claim 17, wherein the computer-executable instructions further cause the data acquisition node to transition to the start-up mode by activating the input interface after the imminent-event message is received, wherein the input interface is operable to receive input from at least one sensor, wherein the at least one sensor is operable to generate a signal that is representative of the physical characteristic of the system.

19. The non-transitory computer-readable medium according to claim 16, herein the computer-executable instructions further cause the data acquisition node to: determine whether a normal mode termination condition is satisfied; and return to the sleep mode after the normal mode termination condition is satisfied.

20. The non-transitory computer-readable medium according to claim 19, wherein the computer-executable instructions further cause the data acquisition node to wirelessly transmit selected sensor data representative of the physical characteristic of the vehicle from the communication interface while in the normal mode.

21. The non-transitory computer-readable medium according to claim 16, wherein the computer-executable instructions further cause the data acquisition node to return to the sleep mode after a trigger timeout elapses in the start-up detect mode.

* * * * *

UNITED STATES PATENT AND TRADEMARK OFFICE
CERTIFICATE OF CORRECTION

PATENT NO. : 9,872,250 B2
APPLICATION NO. : 14/477370
DATED : January 16, 2018
INVENTOR(S) : Nicks et al.

It is certified that error appears in the above-identified patent and that said Letters Patent is hereby corrected as shown below:

In the Claims

In Column 12, Line 51, Claim 19, delete "herein" and insert therefor -- wherein --.

Signed and Sealed this
First Day of May, 2018

Andrei Iancu
*Director of the United States Patent and Trademark Office*